United States Patent [19]
Sakai et al.

[11] Patent Number: 5,819,143
[45] Date of Patent: Oct. 6, 1998

[54] COLOR IMAGE FORMING APPARATUS AND METHOD

[75] Inventors: Yoshihiro Sakai; Yutaka Hasegawa, both of Tokyo; Kazushige Taguchi, Warabi, all of Japan

[73] Assignee: Ricoh Company, Ltd., Tokyo, Japan

[21] Appl. No.: 641,745

[22] Filed: May 2, 1996

[30] Foreign Application Priority Data

May 18, 1995 [JP] Japan .................................. 7-120162

[51] Int. Cl.$^6$ .................................................. G03G 15/36
[52] U.S. Cl. .......................... 399/194; 358/448; 399/182
[58] Field of Search ..................... 399/130, 177, 399/182, 183, 184, 185, 187, 190, 191, 297, 194, 298, 302; 358/448, 452

[56] References Cited

U.S. PATENT DOCUMENTS

| | | |
|---|---|---|
| 4,667,248 | 5/1987 | Kanno . |
| 5,150,458 | 9/1992 | Masuzaki et al. . |
| 5,191,440 | 3/1993 | Levine ................................ 358/448 X |
| 5,268,717 | 12/1993 | Imaizumi ............................... 399/184 |
| 5,442,428 | 8/1995 | Takahashi et al. ...................... 399/302 |
| 5,467,202 | 11/1995 | Washio et al. .......................... 358/448 |
| 5,515,144 | 5/1996 | Miyasaka et al. .................. 358/452 X |

FOREIGN PATENT DOCUMENTS

| | | |
|---|---|---|
| 61-138263 | 6/1986 | Japan . |
| 61-212876 | 9/1986 | Japan . |
| 63-174076 | 7/1988 | Japan . |
| 4-106563 | 4/1992 | Japan . |
| 4-221663 | 8/1992 | Japan . |
| 6-43770 | 2/1994 | Japan . |
| 6-90346 | 3/1994 | Japan . |

*Primary Examiner*—Sandra L. Brase
*Attorney, Agent, or Firm*—Oblon, Spivak, McClelland, Maier, & Neustadt, P.C.

[57] ABSTRACT

In a color image forming apparatus, an electrostatic latent image based on image data is formed onto a photosensitive body. A toner image of the electrostatic latent image is transferred to an intermediate transfer belt. Final toner images are transferred to a transfer material together. Plural original images are synthesized and written onto the intermediate transfer belt by an image processing unit and a writing unit. A process of this image synthesis is displayed in a display of a display editor. The image processing unit and a main control panel write the synthesized images in accordance with a synthetic condition. The toner images finally formed on the intermediate transfer belt are transferred to the transfer material together. Accordingly, the images can be synthesized accurately and the color image forming apparatus can be simply constructed and can be cheaply manufactured. Color image forming methods are also shown.

11 Claims, 9 Drawing Sheets

FIG. 6
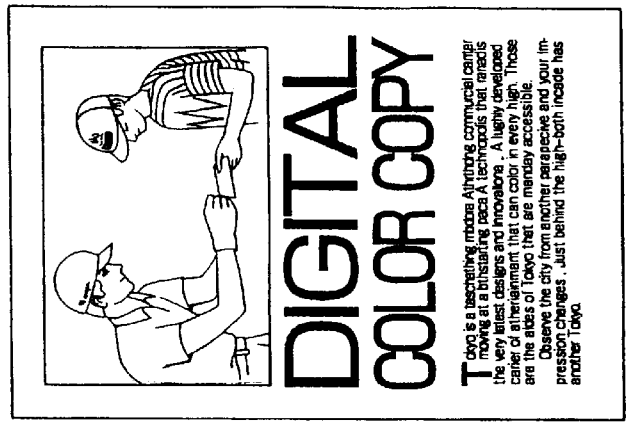
SYNTHETIC COMPLETION OF IMAGES
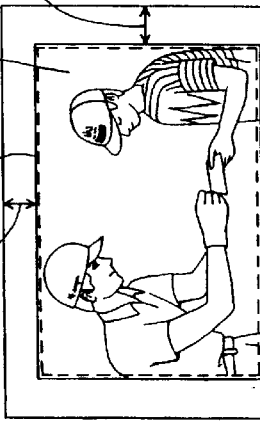
SECOND ORIGINAL
FIRST ORIGINAL

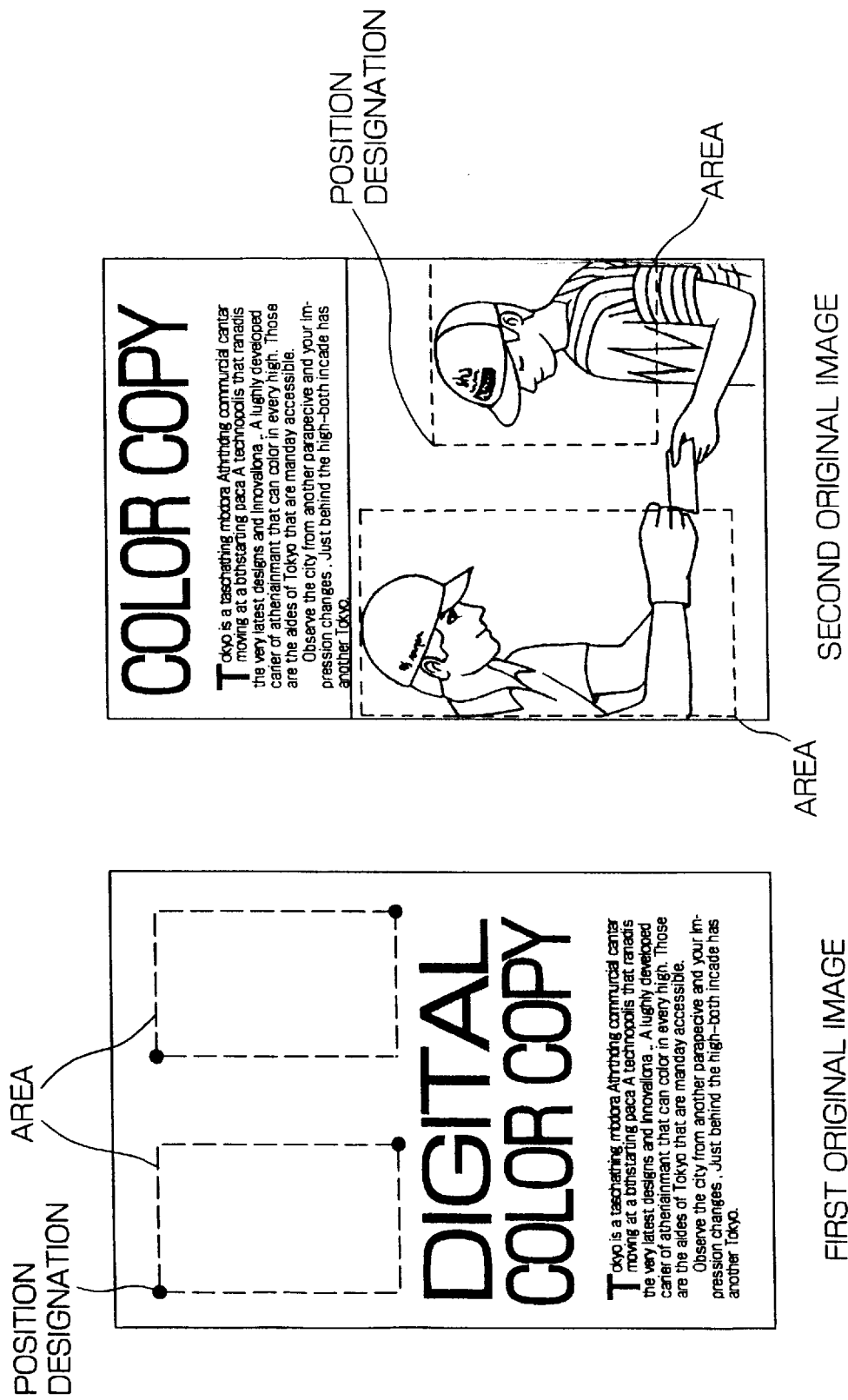

COLOR IMAGE FORMING APPARATUS AND METHOD

BACKGROUND OF THE INVENTION

1. Field of the Invention

The present invention relates to an image forming apparatus such as a copying machine, a printer, a facsimile telegraph, etc. using an electrophotographic system, and a color image forming method. More particularly, the present invention relates to a color image forming apparatus having a display editor as a display editing means and a color image forming method.

2. Description of the Related Art

For example, an image forming apparatus for synthesizing plural images and forming the plural images on a sheet of transfer paper is practically used. For example, a technique of this kind is shown in Japanese Patent Application Laying Open (KOKAI) No. 61-138263. In an image forming apparatus shown in this Japanese laid open patent, an end tip of a recording sheet is gripped by a gripper formed on a rotating member. This image forming apparatus has a normal mode for releasing the gripper after a first image is formed, and separating and discharging the recording sheet from the rotating member. The image forming apparatus also has a mode for synthesizing images by further overlapping and transferring a second image onto the first image without releasing the gripper even after the first image is formed on the recording sheet.

Japanese Patent Application Laying Open (KOKAI) No. 4-106563 shows the construction of a copying machine having an image holding means and transferring images together onto a transfer material after these images are synthesized. In, this case, an image synthesizing range is designated by arranging a means for designating this range in a scanning direction of a scanning means. When a region of two divisions or more is designated, it is necessary to arrange plural simullever mechanisms.

Further, there is another known image forming apparatus constructed such that a large-sized memory is prepared and a first image is stored into this memory and a second image is overlapped on this first image so that an overlapped image is formed and outputted. Another proposed image forming apparatus has a paper refeed mechanism constructed such that a transfer material recording a first image thereon is refed by the paper refeed mechanism and a second image is recorded on this transfer material so that the first and second images are synthesized.

Further, there are the following techniques with respect to the image forming apparatus.

① Japanese Patent Application Laying Open (KOKAI) No. 61-212876 shows an image display printer in which the contents of a toner image are displayed and a hard copy can be made in accordance with necessity.

② Japanese Patent Application Laying Open (KOKAI) No. 4-221663 shows an image recorder in which an image can be recorded by an image making unit after contents, an arrangement, a size, etc. of this image are confirmed.

③ Japanese Patent Application Laying Open (KOKAI) No. 63-174076 shows an electrophotographic printer having a preview device in which an electric video image is generated by projecting an optical image of an original document to a sensing means and the optical image is simultaneously projected to a photosensitive body so that an electrostatic latent image is formed.

④ Japanese Patent Application Laying Open (KOKAI) No. 6-43770 shows an operation control method of an image forming apparatus in which a circumferential rotating operation of an intermediate transfer member during an overlapping transfer process thereof is performed for a short time while a constant load state of the intermediate transfer member is maintained.

⑤ Japanese Patent Application Laying Open (KOKAI) No. 6-90346 shows an image processor in which the relation in position between an original and an original image can be confirmed in correction of an editing region and contents of the original image can be confirmed in accordance with a correcting operation.

When images are synthesized many times on the transfer paper sheet in the image forming apparatus shown in the above Japanese Patent Application Laying Open (KOKAI) No. 61-138263, gripping force of the transfer paper sheet is weakened so that a paper jam, etc. are caused and there is a fear of a reduction in quality of the images. When the transfer paper sheet is held for a long time, there is a possibility of generation of a defect in the next synthesized image since characteristics of the transfer paper sheet are changed m by a peripheral environment. Further, since no contents of the synthesized image can be confirmed, there is a fear of waste of the paper sheet when this image is formed as it is.

In the copying machine shown in Japanese Patent Application Laying Open (KOKAI) No. 4-106563, an image is designated only in a cross scanning direction. Therefore, it is necessary to control an image movement in the cross scanning direction by setting timings of belt transfer, charging, exposure, development, etc. so that construction and control of the copying machine become complicated. Further, the plural simullever mechanisms are required so that cost of the copying machine is increased and the copying machine is large-sized.

In the above construction using the paper refeed mechanism, it is necessary to refeed a transfer paper sheet once discharged. Accordingly, it is difficult to align positions of images with each other and construction and control of the paper refeed mechanism become complicated. Therefore, it is necessary to arrange the paper refeed mechanism and cost of the image forming apparatus is increased.

SUMMARY OF THE INVENTION

It is therefore an object of the present invention to provide a color image forming apparatus and a color image forming method cheaply constructed such that images can be synthesized accurately and simply.

The above object can be achieved by a color image forming apparatus in which an electrostatic latent image based on image data is formed on a photosensitive body and a toner image obtained by developing this electrostatic latent image by using toner is transferred from the photosensitive body to a carrier, and toner images of one or plural colors are transferred to a transfer material together after each of these toner images of one or plural colors is completely transferred to the carrier;

the color image forming apparatus comprising:
  writing means for synthesizing plural original images onto the carrier;
  display editing means for displaying the original images to be synthesized in a display; and
  control means for writing the synthesized images in accordance with a synthetic condition and transferring the toner images finally formed on the carrier to the transfer material together.

The above object can be also achieved by a color image forming method in which an electrostatic latent image based on image data is formed on a photosensitive body and a toner image obtained by developing this electrostatic latent image by using toner is transferred from the photosensitive body to a carrier, and toner images of one or plural colors are transferred to a transfer material together after each of these toner images of one or plural colors is completely transferred to the carrier;

the color image forming method comprising the steps of:

a step for reading a first original by color image reading means;

a step for forming a first original image read by the color image reading means on the carrier simultaneously when the first original image is displayed on a display;

a step for reading a second original by the color image reading means;

a step for synthesizing a second original image read by the color image reading means onto the carrier forming the first original image thereon simultaneously when the second original image is displayed on the display; and a step for transferring the synthetic images formed on the carrier to a transfer member together.

The above object can be also achieved by a color image forming method in which an electrostatic latent image based on image data is formed on a photosensitive body and a toner image obtained by developing this electrostatic latent image by using toner is transferred from the photosensitive body to a carrier, and toner images of one or plural colors are transferred to a transfer material together after each of these toner images of one or plural colors is completely transferred to the carrier;

the color image forming method comprising the steps of:

a step for reading a first original by color image reading means;

a step for forming a first original image read by the color image reading means on the carrier simultaneously when the first original image is displayed on a display;

a step for reading a second original by the color image reading means;

a step for displaying a second original image read by the color image reading means on the display;

a step for designating a synthetic condition of the second original image with respect to the first original image on the display;

a step for displaying a synthetic image composed of the first and second original images on the display in accordance with the synthetic condition;

a step for again reading the second original by the color image reading means;

a step for synthesizing the second original image onto the carrier forming the first original image thereon in accordance with the synthetic condition; and a step for transferring the synthetic images formed on the carrier to a transfer member together.

The above object can be also achieved by a color image forming method in which an electrostatic latent image based on image data is formed on a photosensitive body and a toner image obtained by developing this electrostatic latent image by using toner is transferred from the photosensitive body to a carrier, and toner images of one or plural colors are transferred to a transfer material together after each of these toner images of one or plural colors is completely transferred to the carrier;

the color image forming method comprising the steps of:

a step for reading a first original by color image reading means;

a step for displaying a first original image read by the color image reading means on the display;

a step for designating a synthetic condition of the first original image on the display;

a step for displaying a synthetic image of the first original image on the display in accordance with the synthetic condition of the first original image;

a step for again reading the first original by the color image reading means;

a step for synthesizing the first original image onto the carrier in accordance with the synthetic condition of the first original image;

a step for reading a second original by the color image reading means;

a step for displaying a second original image read by the color image reading means on the display;

a step for designating a synthetic condition of the second original image on the display;

a step for displaying a synthetic image composed of the first and second original images on the display in accordance with the synthetic condition of the second original image;

a step for again reading the second original by the color image reading means;

a step for synthesizing the second original image onto the carrier forming the first original image thereon in accordance with the synthetic condition of the second original image; and a step for transferring the synthetic images formed on the carrier to a transfer material together.

In each of the above constructions, the color image forming apparatus and the color image forming method are cheaply constructed such that images can be synthesized accurately and simply.

Further objects and advantages of the present invention will be apparent from the following description of the preferred embodiments of the present invention as illustrated in the accompanying drawings.

BRIEF DESCRIPTION OF THE DRAWINGS

FIG. 6 is an explanatory view showing first and second originals as objects of image synthesis, and an image obtained after completion of synthesis;

FIG. 7 is an explanatory view showing one example of each of the first and second originals belonging to complicated image synthesis;

DESCRIPTION OF THE PREFERRED EMBODIMENTS

The preferred embodiments of a color image forming apparatus and a color image forming method in the present invention will next be described in detail with reference to the accompanying drawings.

Figure 1:
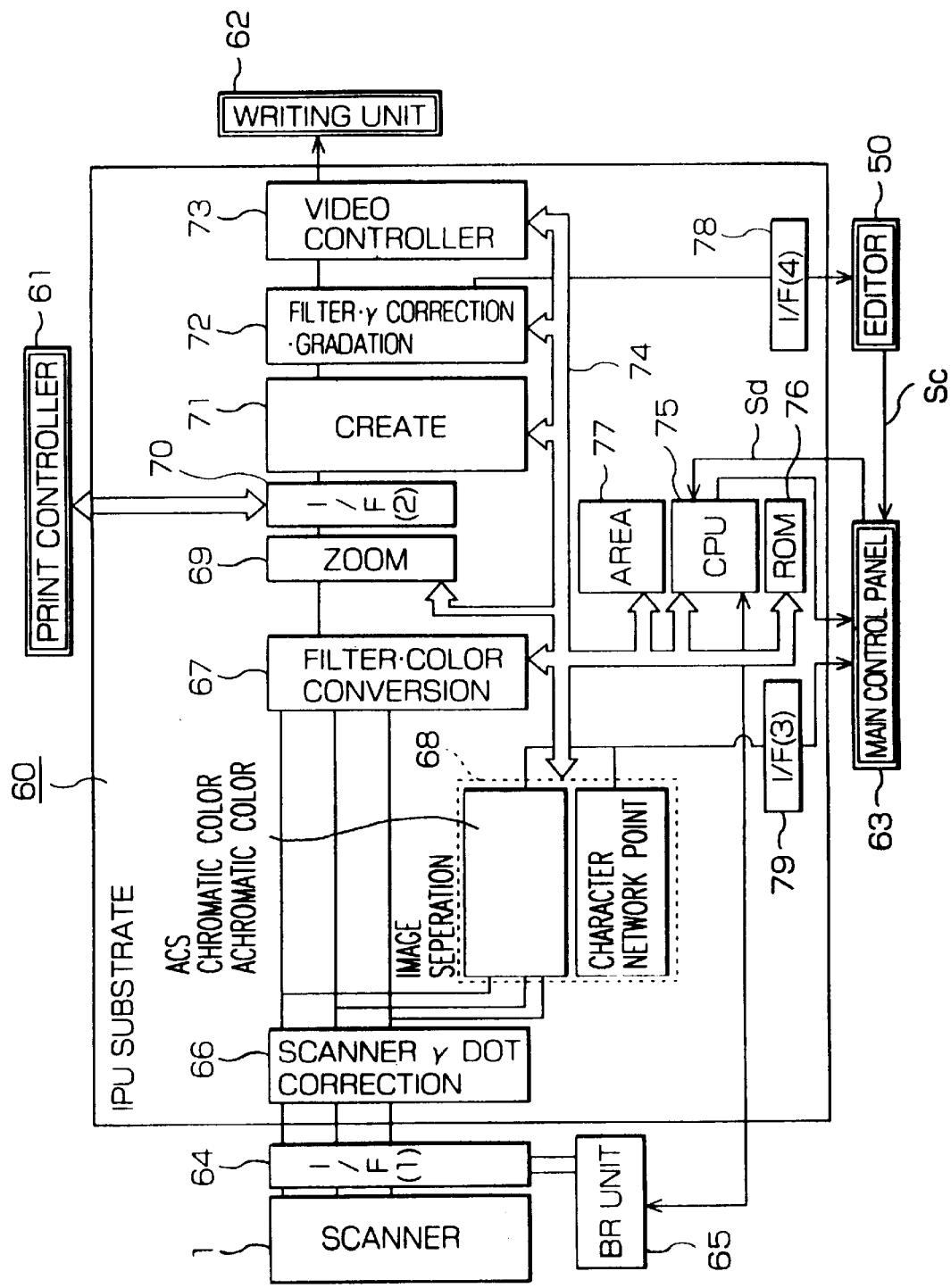
FIG. 1 is a block diagram showing the construction of an image processing section in a color image forming apparatus of the present invention.
Figure 2:
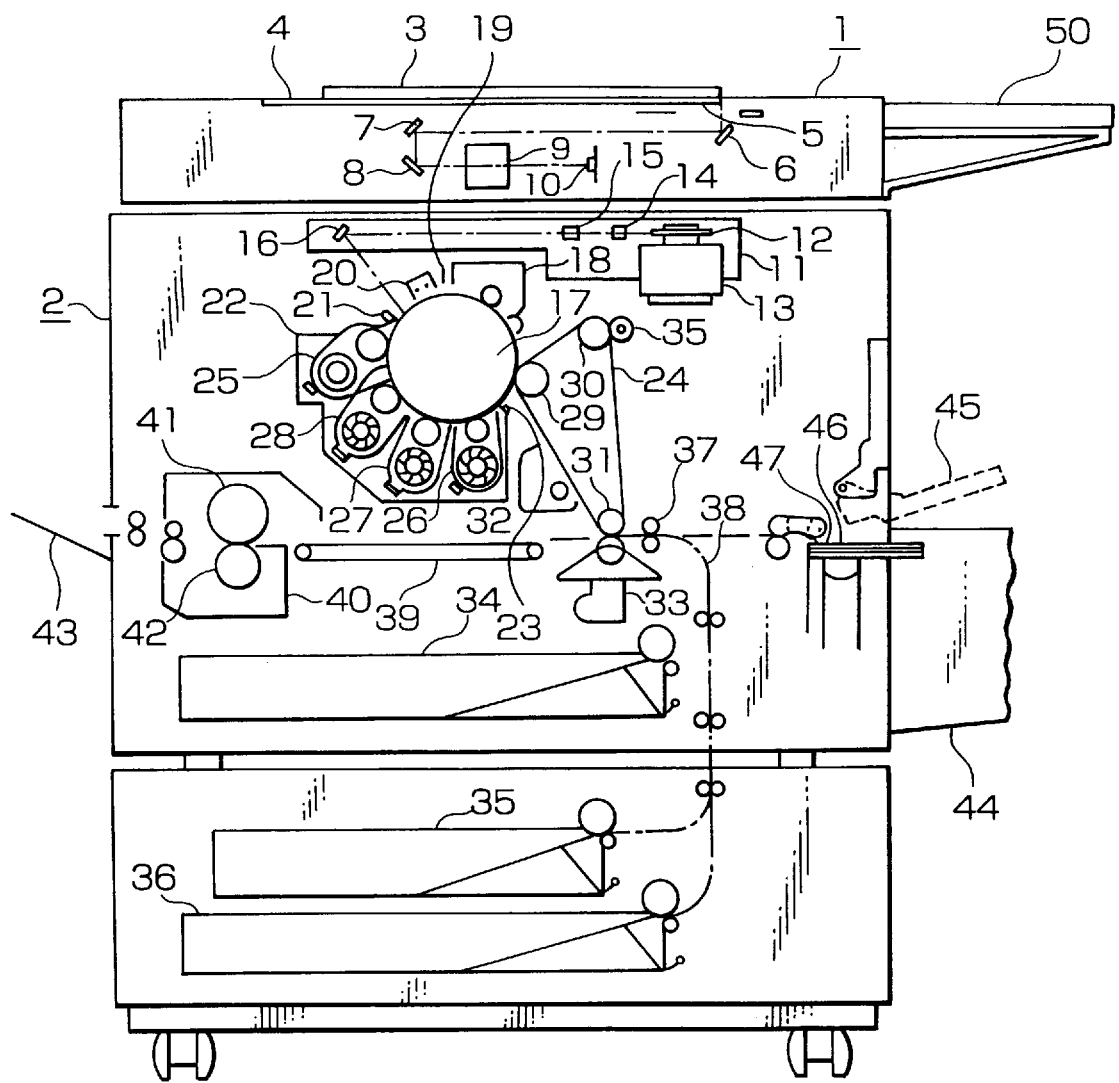
FIG. 2 is a front view showing a mechanical section of the color image forming apparatus in the present invention.
Figure 3:
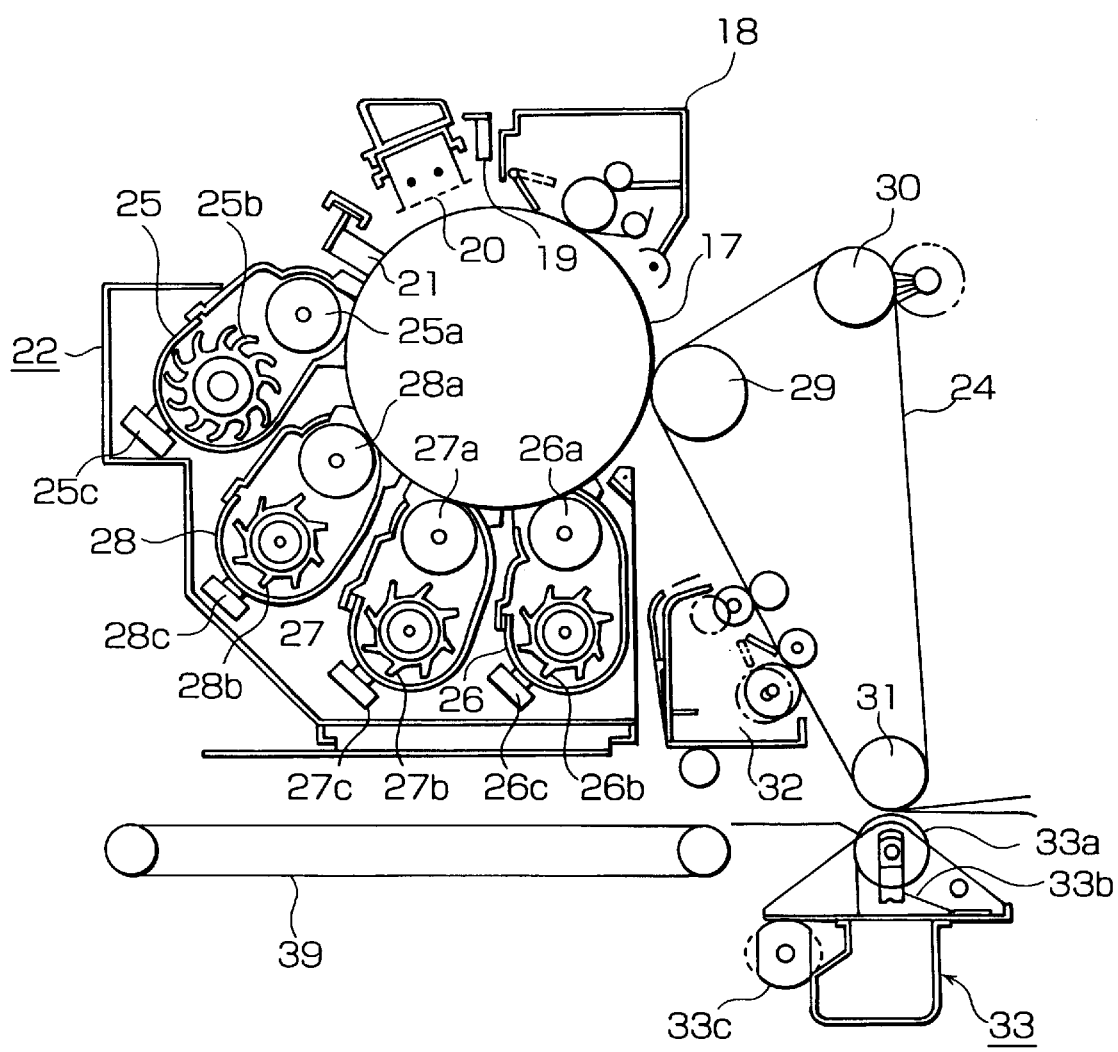
FIG. 3 is a front view showing an image forming section in the present invention.

FIG. 1 is a block diagram showing the construction of an image processing section in a color image forming apparatus in the present invention. FIG. 2 is a front view showing the construction of a mechanical section of the color image forming apparatus in the present invention. A portion of the mechanical section is shown in cross section in FIG. 2. FIG. 3 is a front view showing the detailed construction of an image forming section in the present invention. A portion of the image forming section is shown in cross section in FIG. 3.

The constructions shown in FIGS. 2 and 3 will first be explained. A color image recorder (called a color printer in the following description) 2 as a writing means is arranged below a color image reader (called a color scanner in the following description) 1 as a reading means. The color image forming apparatus in the present invention has a display editor 50 as a display editing means for displaying an original image read by the color scanner.

A contact glass 4 is arranged on an upper face of the color scanner 1 such that an original 3 can be put on the contact glass 4. An optical scanner mechanism is arranged within the color scanner 1. This scanner mechanism includes an illuminating lamp 5 for illuminating the original 3 and also includes a mirror 6 for reflecting reflected light (reading light) from the original 3 in a horizontal direction at an illuminating time. The illuminating lamp 5 and the mirror 6 are integrally constructed. Image data of one color are read every time the scanner mechanism is reciprocated one time on a lower side of the original 3. Image data of four colors can be obtained by repeating this reciprocating movement of the scanner mechanism four times.

A mirror 7 is fixedly arranged on an emitting optical path of the mirror 6. A mirror 8 for reflecting light from the mirror 7 in the horizontal direction is arranged just below this mirror 7. An optical system 9 and a color sensor 10 are sequentially arranged on the emitting optical path of this mirror 8.

The color sensor 10 converts image information to an electric signal. The color sensor 10 is constructed by using a photoelectric converting element for reading color image information every color decomposition of blue (B), green (G) and red (R). Concretely, the color sensor 10 is constructed by using a charge coupled device (CCD). Further, a color decomposing means of blue, green and red is attached to the color sensor 10. Color conversion is processed by the image processing section shown in FIG. 1 on the basis of color decomposing image signal intensities of blue, green and red obtained by this color sensor 10. Thus, color image data of black (BK), cyan (C), magenta (M) and yellow (Y) are obtained. The color image data are obviously developed to black (BK), cyan (C), magenta (M) and yellow (Y) by the color printer 2 so that a color copy can be obtained.

The construction of the color printer 2 will next be explained.

The color printer 2 has a writing optical unit 11. This optical unit 11 is constructed by a polygon mirror 12, a motor 13 for rotating this polygon mirror 12, a laser beam source 14, an f θ lens 15 and a mirror 16. The f θ lens 15 corrects its focal length such that the focal length is equal irrespective of a change in distance from a deflecting portion to a spot. The mirror 16 reflects a laser beam from this f θ lens 15 in a predetermined direction.

A photosensitive drum 17 is arranged below the optical unit 11. The following members are continuously arranged in a rotating direction of the photosensitive drum 17 such that the photosensitive drum 17 is surrounded by these members and these members make a round. Namely, a cleaning unit 18, an electricity removing lamp 19, a charger 20, a potential sensor 21, a color developing apparatus 22, a developing density pattern detector 23 and an intermediate transfer belt (a carrier) 24 are arranged. The cleaning unit 18 removes toner remaining a surface of the photosensitive drum 17 therefrom. The cleaning unit 18 includes an electricity removing device before cleaning of toner. The electricity removing lamp 19 removes charges on the surface of the photosensitive drum 17 therefrom. The charger 20 uniformly charges the photosensitive body with electricity before exposure. The potential sensor 21 detects a charging level.

The color developing apparatus 22 has developing devices of four colors composed of a black (BK) developing device 25, a cyan (C) developing device 26, a magenta (M) developing device 27 and a yellow (Y) developing device 28. The intermediate transfer belt 24 is rotated in a state in which this intermediate transfer belt 24 is wound around each of a transfer bias roller 29, a driven roller 30 and a driving roller 31 (driven by an unillustrated drive motor). Further, a belt cleaning unit 32 for removing toner, etc. attached to the intermediate transfer belt 24 therefrom is adjacent to the intermediate transfer belt 24. A paper transfer unit 33 is arranged in a position opposed to the driving roller 31. A conveying path 38 including a resist roller 37 is arranged to feed a sheet of transfer paper from each of transfer paper sheet cassettes 34, 35 and 36 to this paper transfer unit 33 and the intermediate transfer belt 24. Transfer paper sheets having different sizes are respectively stored and set in the transfer paper sheet cassettes 34, 35 and 36.

A paper conveying unit 39 is horizontally arranged below the color developing apparatus 22 to convey a transferred paper sheet. A fixing device 40 is arranged at an end of the paper conveying unit 39. The fixing device 40 has a fixing roller 41 and a pressurizing roller 42 and melts and fixes a toner-image onto a paper face by heat and pressure. The fixed sheet of copying paper is discharged to the exterior of the color developing apparatus and is fed onto a copy tray 43.

A transfer paper sheet cassette 44 is mounted to a side portion of the color printer 2 from its exterior. Further, a manual paper feed tray 45 is mounted to the side portion of the color printer 2. OHP (over head projector) paper sheets, thick paper sheets, etc. are set in this manual paper feed tray 45. Reference numerals 46 and 47 respectively designate transfer paper sheets and a paper feed roller.

The optical unit 11 converts color image data from the color scanner 1 to an optical signal and forms a light beam corresponding to an original image. The optical unit 44 exposes this light beam in a specific position of the photosensitive drum 17 charged in advance so that an electrostatic latent image is formed. The photosensitive drum 17 is rotated in the counterclockwise direction in FIG. 2. One color is developed and transferred by one rotation of this photosensitive drum 17. A sheet of transfer paper is fed from one of the transfer paper sheet cassettes to the resist roller 37. Toner of one color (black in this embodiment) is developed by the color developing apparatus 22 in a forming position of the electrostatic latent image in a rotating process of the photosensitive drum 17. The intermediate transfer belt 24 is simultaneously rotated together with the rotation of the photosensitive drum 17. When a visual image obtained by the toner development reaches a position of the transfer bias roller 29, an image of a first color in the visual image (toner image) is continuously transferred to the intermediate transfer belt 24. There are three methods for transferring second to fourth colors to the intermediate transfer belt 24. Namely, there are three operating methods of the intermediate transfer belt 24. These three operating methods will be described later.

The construction shown in FIG. 3 will next be explained.

As mentioned above, the color developing apparatus 22 has developing devices of four colors composed of the black (BK) developing device 25, the cyan (C) developing device 26, the magenta (M) developing device 27 and the yellow (Y) developing device 28. Each of these developing devices has a similar construction. Namely, the black (BK) developing device 25 has a developing sleeve 25a, a developing paddle 25b and a toner density detecting sensor 25c. The developing sleeve 25a makes a head portion of a developer come in contact with a surface of the photosensitive drum 17. The developing paddle 25b draws up the developer and stirs this developer. The toner density detecting sensor 25c detects a toner density of the developer. The developing sleeve 25a and the developing paddle 25b are rotatably constructed.

Similarly, the cyan (C) developing device 26 has a developing sleeve 26a, a developing paddle 26b and a toner density detecting sensor 26c. The magenta (M) developing device 27 has a developing sleeve 27a, a developing paddle 27b and a toner density detecting sensor 27c. The yellow (Y) developing device 28 has a developing sleeve 28a, a developing paddle 28b and a toner density detecting sensor 28c.

The paper transfer unit 33 is constructed by a paper transfer bias roller 33a, a roller cleaning blade 33b and a separating mechanism 33c for separating a transfer paper sheet from the intermediate transfer belt 24. The paper transfer bias roller 33a is normally separated from the intermediate transfer belt 24.

Development and transfer of the second color or later will next be explained. As mentioned above, the intermediate transfer belt 24 is operated by three methods composed of (1) a constant speed going system, (2) a skip going system and (3) a reciprocating (quick return) system.

(1) The constant speed going system

① The intermediate transfer belt 24 continuously goes at a constant speed as it as after a black toner image is transferred to the intermediate transfer belt 24 from the photosensitive drum 17.

② When an end tip position of the black image on a surface of the intermediate transfer belt 24 again reaches a belt transfer position of a contact portion between the intermediate transfer belt 24 and the photosensitive drum 17, a toner image of cyan as a second color is formed by setting timing of the photosensitive drum 17 such that an end tip portion of the cyan toner image is located just in this position. Thus, the cyan image is overlapped on the intermediate transfer belt 24 and is transferred onto this belt in a state in which the cyan image is accurately positioned in conformity with the black image.

③ Similar operations are performed later so that magenta and yellow image processes are started. Thus, belt transfer images (color image) of the four overlapped colors are obtained.

④ After a toner image of yellow as the fourth color is transferred onto the intermediate transfer belt 24, the toner images (color image) of the four overlapped colors on the surface of the intermediate transfer belt 24 are transferred onto a transfer paper sheet 46 together while the intermediate transfer belt 24 goes as it is.

(2) The skip going system

① When a black toner image is completely transferred to the intermediate transfer belt 24, the intermediate transfer belt 24 is separated from the surface of the photosensitive drum 17 and is skipped at a high speed in a going direction as it is. After the intermediate transfer belt 24 is moved by a predetermined amount, the speed of the intermediate transfer belt 24 is returned to an initial going speed. Thereafter, the intermediate transfer belt 24 again comes in contact with the photosensitive drum 17.

② When an end tip position of the black image on the surface of the intermediate transfer belt 24 again reaches a belt transfer position, an image of the next cyan is formed by setting timing of the photosensitive drum 17 such that an end tip portion of the cyan image is located just in this position. Thus, the cyan image is accurately positioned in conformity with the black image. The black and cyan images are overlapped and transferred to the intermediate transfer belt 24.

③ Similar operations are subsequently performed so that magenta and yellow image processes are started. Thus, belt transfer images (color image) of the four overlapped colors are obtained.

④ After the yellow toner image of the fourth color is transferred to the intermediate transfer belt 24, the toner images (color image) of the four overlapped colors on the intermediate transfer belt 24 are transferred onto the transfer paper sheet 46 together at the same going speed.

(3) The reciprocating (quick return) system

① After a black toner image is completely transferred to the intermediate transfer belt 24, the intermediate transfer belt 24 is separated from the photosensitive drum 17. Further, the intermediate transfer belt 24 is returned at a high speed in a reverse direction simultaneously when a going movement of the intermediate transfer belt 24 is stopped. In this returning case, the intermediate transfer belt 24 is stopped and attains a standby state after an end tip of the black image on the surface of the intermediate transfer belt 24 passes through a belt transfer corresponding position in a reverse direction and is further moved by a distance set in advance.

② Next, when an end tip portion of a cyan toner image on a side of the photosensitive drum 17 reaches a predetermined position before a transfer position on the intermediate transfer belt 24, the intermediate transfer belt 24 is again started in its going direction. The intermediate transfer belt 24 again comes in contact with the surface of the photosensitive drum 17. In this case, the cyan image is transferred to the intermediate transfer belt 24 by controlling its operation in a condition in which the cyan image is accurately overlapped with the black image on a surface of the intermediate transfer belt 24.

③ Similar operations are subsequently performed so that magenta and yellow image processes are started. Thus, belt transfer images (color image) of the four overlapped colors are obtained.

④ After a toner image of yellow as the fourth color is transferred to the intermediate transfer belt 24, the intermediate transfer belt 24 goes at the same speed without returning this intermediate transfer belt 24. Toner images (color image) of the four overlapped colors on the surface of the intermediate transfer belt 24 are transferred to a transfer paper sheet 46 together.

As mentioned above, the toner images (color image) of the four colors are transferred together from the surface of the intermediate transfer belt 24 to the transfer paper sheet 46 by rotating the resist roller 37 and feeding the transfer paper sheet to a position of the paper transfer bias roller 33a. Thereafter, the transfer paper sheet is further fed to the paper conveying unit 39 and a fixing operation of the toner images is performed by the fixing device 40. Thereafter, the transfer paper sheet is discharged onto the copy tray 43.

In contrast to this, the photosensitive drum 17 is cleaned by the cleaning unit 18 every time one color transfer to the intermediate transfer belt 24 is terminated. Further, an electricity removing operation of the photosensitive drum 17 is uniformly performed by the electricity removing lamp 19. The surface of the intermediate transfer belt 24 is cleaned by the belt cleaning unit 32 to prepare for the next copy after the toner images of the four overlapped colors are transferred to the transfer paper sheet.

In the case of a repeat copy, the black (first color) image process of a first sheet is started in predetermined timing after the yellow (fourth color) image process of the first sheet in the operation of the color scanner 1 and the image formation on the photosensitive drum 17. After the transfer process in which the four-color overlapped images (color image) of the first sheet are transferred to the transfer paper sheet together, a black toner image of a second sheet is transferred to the intermediate transfer belt 24 in a region in which the surface of the intermediate transfer belt 24 is cleaned by the belt cleaning unit 32.

The above explanation relates to a case in which the four full colors are obtained. However, in each of the cases of a three-color copy and a two-color copy, the above-mentioned operation is performed by designated colors and the number of designated times. In the case of a monochromatic copy, only a developing device of this color is set to attain a development operating state while a predetermined number of sheets are completely copied. The intermediate transfer belt 24 is moved at a constant speed in a going direction while the intermediate transfer belt 24 comes in contact with the surface of the photosensitive drum 17. Further, a copying operation is performed in a state in which the belt cleaning unit 32 comes in contact with the intermediate transfer belt 24.

The construction of an image processing unit 60 shown in FIG. 1 will next be explained.

A print controller 61, a writing unit 62, a main control panel 63, an interface (I/F) 64, a BR unit 65 and a display editor 50 are connected to the image processing unit (IPU) 60. The print controller 61 executes control for printing. The writing unit 62 writes image data to the photosensitive drum 17. The main control panel 63 forms a control means together with the image processing unit 60. The interface (I/F) 64 performs an interfacing operation with the color scanner 1.

The image processing unit 60 has blocks explained in the following description.

An output signal of the color scanner 1 is inputted to a γ-correcting block 66. This output signal shows image data of red (R), green (G) and blue (B) obtained by reading an original 3 and shows a reflectivity linear signal of 8 bits in each of colors. The γ-correcting block 66 converts the image data R, G and B to a density linear signal. The γ-correcting block 66 is connected to a filter block 67 and an image separating block 68. The filter block 67 performs a filtering operation with respect to the image data and performs data conversion for forming an image by using cyan (C), magenta (M) and yellow (Y) at a copying time from the image data B, G and R at an image reading time. The image separating block 68 judges a character region or a photograph region (otherwise, a chromatic color region or an achromatic color region) in a unit of m×m bits (e.g., 4×4 bits) from input data. The image separating block 68 outputs the judged results to the filter block 67. The judged results are shown by two-bit data ("0" of bit 0: character, "1" of bit 0: photograph, "0" of bit 1: chromatic color, and "1" of bit 1: achromatic color are set).

A zooming block 69 for converting sizes of an output image is connected to the filter block 67. An interface (I/F) 70 is connected to this zooming block 69 such that data are transmitted between the zooming block 69 and the print controller 61. Further, a creating block 71 is connected to the interface 70 so as to perform various kinds of editing processings (mirror face, shading, slanting style, repeat, interior extraction, color processing, etc.) in accordance with taste of a user. A gradation correction-γ-correction-filter block 72 is connected to this creating block 71. In this gradation correction, through processing (input data are outputted as they are) is performed if character processing of edited image data is performed. If photograph processing of the edited image data is performed, gradation processing is performed in block unit. Further, the edited image data are processed such that a character region is clearly seen. In this processing, a correction of the edited image data, etc. are executed such that a low density portion is shown in white and a portion from an intermediate density to a high density is dark in color. Further, filtering and γ-correction with respect to the image data are made to write the image data. A video controller 73 is connected between the writing unit 62 and the gradation correction-γ-correction-filter block 72 to write the image data thus obtained.

A bus 74 is connected between the image separating block 68, the zooming block 69, the creating block 71, the gradation correction-γ-correction-filter block 72 and the video controller 73. This bus 74 is constructed by an address bus, a data bus and a control bus. This bus 74 is connected to a CPU 75, a ROM 76 and an area processing block 77. The CPU 75 executes various kinds of controls in the image processing unit 60. Programs for operating this CPU 75 are stored into the ROM 76. This area processing block 77 has a function for calculating a zooming rate and an image moving amount in accordance with designation of a synthetic region for synthesizing first and second original images.

Further, an interface (I/F) 78 is connected between the display editor 50 and the gradation-correction-γ-correction-filter block 72. An interface (I/F) 79 is also connected between the image separating block 68 and the main control panel 63.

Figure 4:
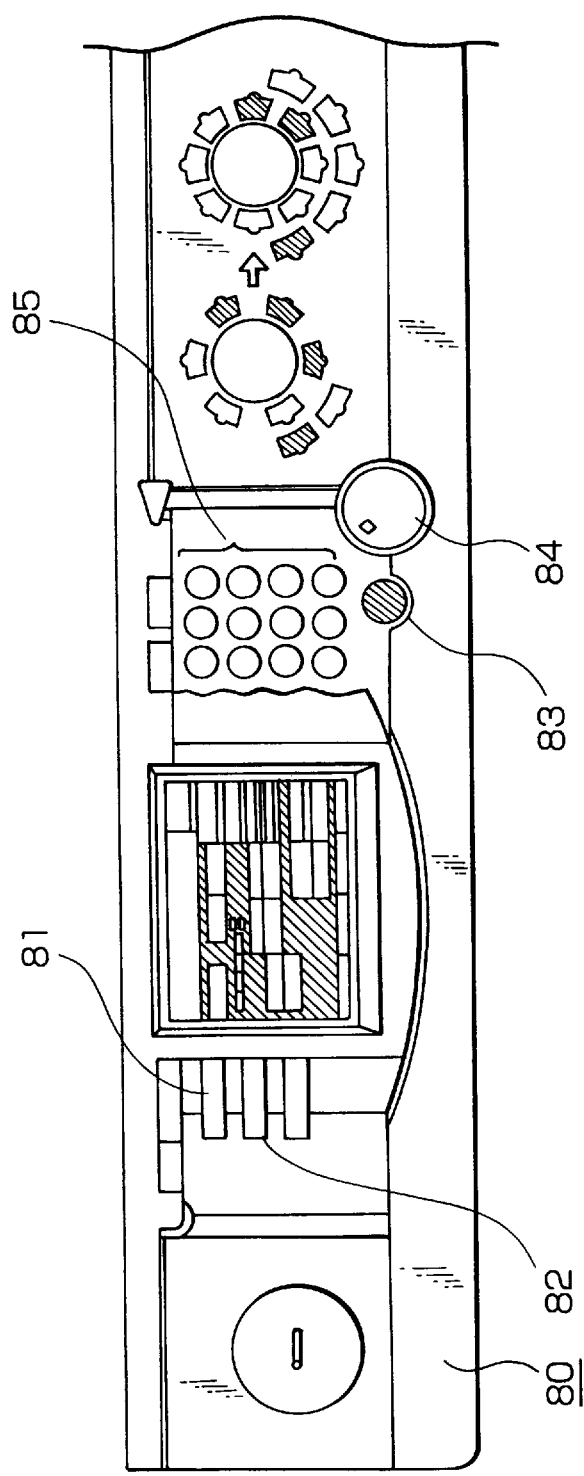
FIG. 4 is a plan view showing an operating section of the color image forming apparatus in the present invention.

FIG. 4 is a plan view showing a detailed operating section operated when a copy, etc. are made.

The operating section 80 has a synthetic key 81 for designating image synthesis, an option key 82, a clear/stop key 83, a print starting key 84, a ten key 85 for designating the number of copies, etc.

Figure 5:
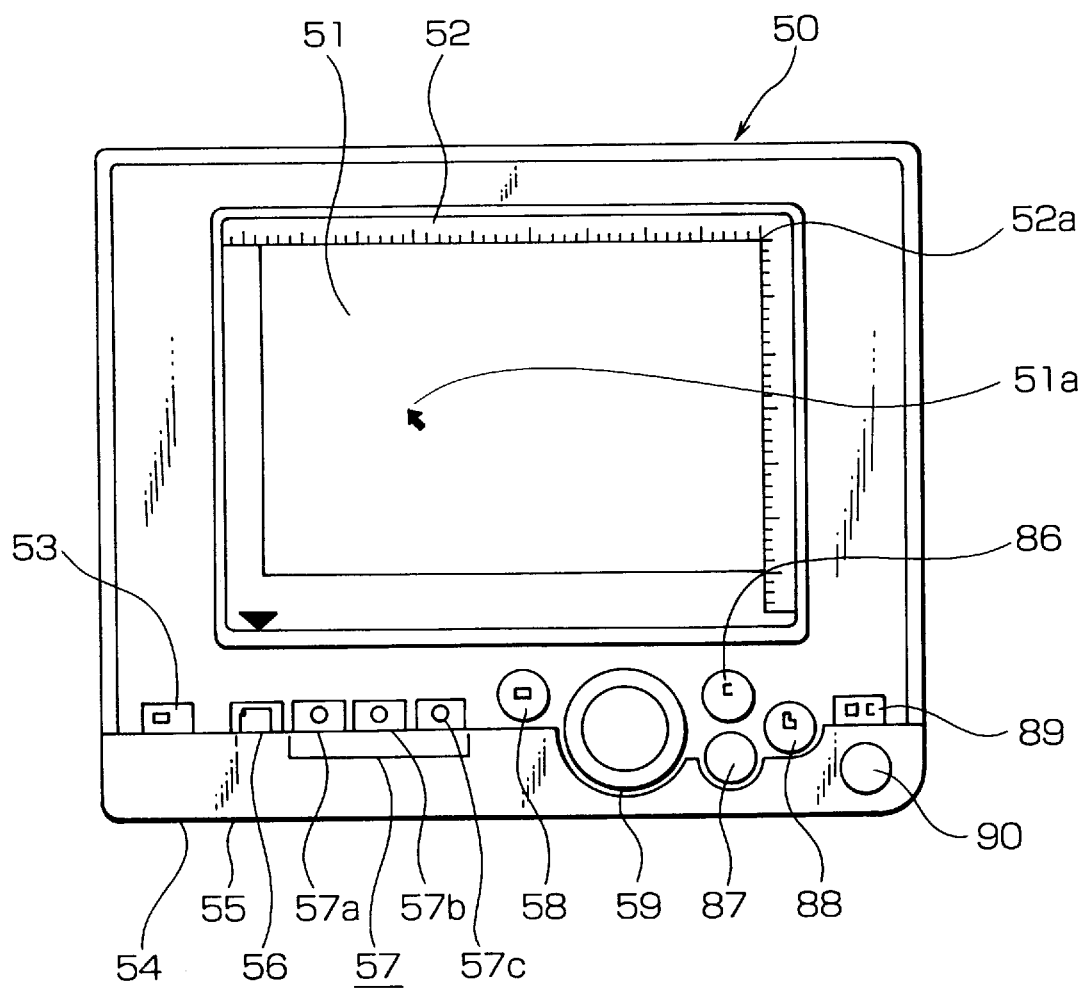
FIG. 5 is a plan view showing a display editor in the present invention in detail.

FIG. 5 is a plan view showing the display editor 50 in detail.

An indicator 51 using a CRT, a liquid crystal, etc. is arranged in a central portion of the display editor 50. The indicator 51 performs various kinds of displays and display of a cursor 51a in accordance with an operation of the operating section 80. Scales 52 are arranged on upper and right-hand sides of the indicator 51. A display reference (0) 52a is noted in a corner portion formed in the shape of a character L.

A reading key 53 for starting a reading operation of an original is arranged in a lower portion of the indicator 51. A contrast adjusting thumbscrew 54 for adjusting contrast of the indicator 51 is also arranged in the lower portion of the indicator 51. A brightness adjusting key 55 for adjusting brightness of the indicator 51 is also arranged in the lower portion of the indicator 51. An entire key 56 for displaying an entire image is also arranged in the lower portion of the indicator 51. A zooming key 57 for designating zoom of the image with the cursor 51a as a center is also arranged in the lower portion of the indicator 51. The zooming key 57 includes a reducing key 57a, an enlarging key 57b and a zoom key 57c. A scroll key 58 for scrolling the screen is also arranged in the lower portion of the indicator 51. A cursor key 59 for moving the cursor 51a to an arbitrary position within the indicator 51 is also arranged in the lower portion of the indicator 51. A clear key 86 for canceling a finally designated point is also arranged in the lower portion of the indicator 51. A point designating key 87 for designating a point shown by the cursor 51a is also arranged in the lower portion of the indicator 51. A closing key 88 for designating and connecting a starting point and a terminal point to each other at a designating time of an area having a rectangular exterior angular shape or a polygonal shape is also arranged in the lower portion of the indicator 51. An all clear key 89 for canceling all designated points is also arranged in the lower portion of the indicator 51. A redisplay key 90 for again displaying an image after processing of the image is further arranged in the lower portion of the indicator 51.

Image processing in the present invention will next be explained.

First, a first original shown in color and constructed by only characters as shown in FIG. 6 is put on the color scanner 1. The synthetic key 81 of the operating section 80 is then pushed down. Further, the number of synthetic times is inputted by operating the ten key 85. When "2" is inputted as the number of synthetic times, a second original is synthesized with respect to the first original shown in FIG. 6. In contrast to this, when "31" is inputted as the number of synthetic times, a third image is synthesized with respect to a synthetic image of the first and second originals. In this embodiment, the case of two syntheses will be explained.

After image synthesis is designated and the number of synthetic times is designated and the print starting key 84 is then pushed down, an image of the first original is formed on the photosensitive drum 17 as mentioned above. Thereafter, a color image is transferred to the intermediate transfer belt 24 every color so that images of four overlapped colors are formed. At this time, an operation different from that in the item ④ in the basic operation explanation described in the above reciprocating system is performed to synthesize the images. Namely, after a toner image of the fourth yellow is completely transferred to the intermediate transfer belt 24, the intermediate transfer belt 24 is separated from the photosensitive drum 17 and a going movement of the intermediate transfer belt 24 is stopped. Simultaneously, the intermediate transfer belt 24 is returned at a high speed in a reverse direction and an operation similar to that in the item ① in the reciprocating system is performed. After the intermediate transfer belt 24 is returned, the intermediate transfer belt 24 attains a standby state. Thus, the image of the first original is held as a toner image on the intermediate transfer belt 24. When the image synthesis is stopped at this time point, the image on the intermediate transfer belt 24 is cleaned by the cleaning unit 18 if the clear/stop key 83 is pushed down.

Next, the second original shown in FIG. 6 is set on the contact glass 4 and an image is formed by development using scanning and the photosensitive drum 17. Thus, a toner image is transferred onto the intermediate transfer belt 24. Image synthesis is completed if four colors of the second original are completely overlapped on the intermediate transfer belt 24. Then, similar to the explanation in the item ④ in the reciprocating system, the intermediate transfer belt 24 is moved. Thereafter, the image is fixed onto a transfer paper sheet and this transfer paper sheet is discharged onto the external copy tray 43.

In the above explanation, images are simply synthesized in a positioning case in which the second original is relatively easily positioned by a scale on the contact glass 4 with respect to a synthetic region of the first original. For example, this positioning case is a synthetic case in which there are no problems even when the relative positions of images of the first and second originals are shifted from each other more or less. This positioning case is also a case in which an area position synthesized on the first original and an area position of the second original are approximately located in the same position on a paper sheet of each of the first and second originals. This positioning case is also a case in which the image of the second original is relatively small with respect to a synthetic region of the first original.

As shown in FIG. 7, when the position of a region of the synthesized second original is different from the synthetic region of the first original and these regions are different from each other in size, there is a case in which a picture image and a character image overlap each other in the synthetic method in the above explanation. To solve this problem, there is a method in which image data of an original read by the color scanner 1 are once outputted to the display editor 50.

In this method, when the print starting key 84 is pushed down (turned on), a first original having contents as shown in FIG. 7 is read by the color scanner 1. Similar to the above explanation of the basic operation, an image is formed on the intermediate transfer belt 24 on the basis of image data of the first original. The image data are thinned in an area portion of the first original in FIG. 7 and are outputted to the display editor 50. Next, a second original shown in FIG. 7 is arranged on the contact glass 4. If the reading key 53 is pushed down, the second original is read by the color scanner 1. Image data of the second original are thinned in a portion except for an area portion of the second original in FIG. 7 and are outputted to the display editor 50. At this time, no color printer 2 forms an image with respect to the second original. As shown in FIG. 7, the first and second originals are output-displayed in parallel with each other on the display editor 50.

Figure 8A:
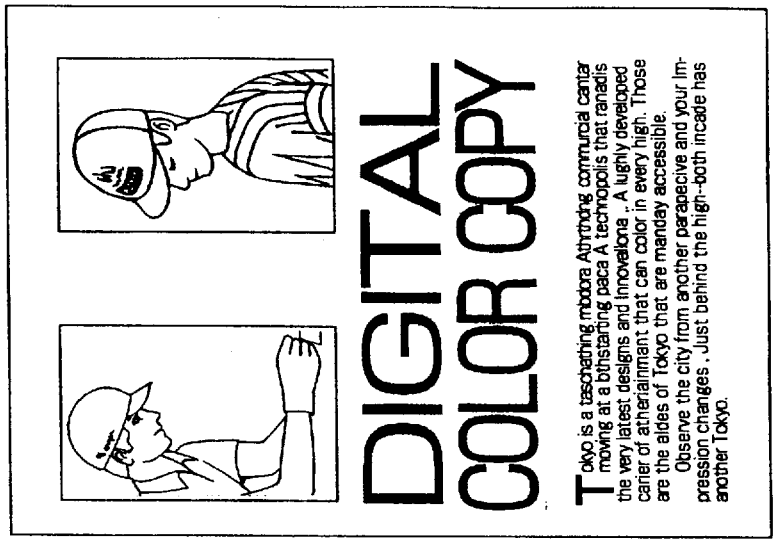
FIG. 8a is an explanatory view showing the contents of a first original image when the first original image is synthesized by zooming.

Next, area designation for designating a synthetic position of the first original image is executed. In this designation, the cursor 51a on the display editor 50 is moved by the cursor key 59 and two opposite points of an area are designated by the point designating key 87. Here, two areas are designated so that four opposite points are designated. Thereafter, when a designated area of the second original is larger (or excessively smaller) than a synthetic area region of the second original image, the designated area of the second original is designated in zoom by the zooming key 57. A zoomed image is outputted to the display editor 50 by pushing the redisplay key 90 down and is displayed in the indicator 51 as shown in FIG. 8a. FIG. 8a is an output view of the second original image with respect to the first original image at a zooming time.

Figure 8B:
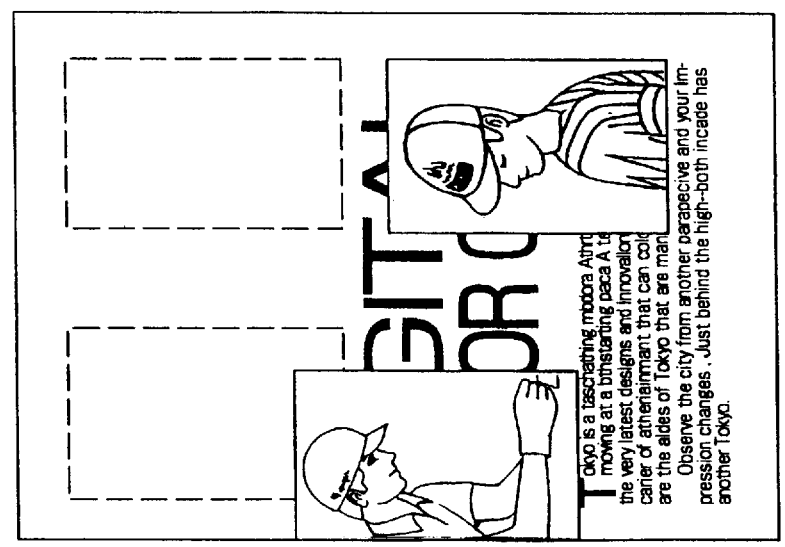
FIG. 8b is an explanatory view showing an image obtained after the second original is positioned.

The sizes of synthesized images are conformed to each other by the zooming processing. However, no positions of the synthesized images are still aligned with each other. Therefore, subsequently, the designated area of the second original is moved to a synthetic region (here, a white paper portion) of the first original by the scroll key 58 designated by the point designating key 87 as shown in FIG. 8b. FIG. 8b is a view of synthetic completion on the display after the positions of the synthesized images are completely aligned with each other. Thus, the image synthesis on the display editor 50 is completed.

In the above explanation, the zooming operation is performed and the images are moved by operating keys. However, if burdens of software and hardware can be increased, a zooming rate and an image moving amount can be automatically calculated by the CPU 75 within the image processing unit 60 in FIG. 1 and can be displayed in the indicator 51 of the display editor 50 by designating the area of the second original after the area of the first original is designated.

Here, the print starting key 84 is operated again and the second original is read by the color scanner 1. A synthetic condition (a relative position and a zooming rate) of the second original synthesized on the display editor 50 is transmitted as command Sc to the main control panel 63 shown in FIG. 1. This main control panel 63 outputs conditional data Sd to the CPU 75 within the image processing unit 60. The writing unit 62 controls writing timing of the optical unit 11 in accordance with the conditional data Sd and image forming timing. The writing unit 62 determines main and cross scanning positions of the second original image and controls a writing operation. In this writing control, similar to the above operation of a normal copy, a toner image of the second original is formed on a toner image of the first original on the intermediate transfer belt 24 in a state in which zooming rates and relative positions of the first and second original images are respectively conformed to each other. Thus, the toner images of the first and second originals are synthesized. Thereafter, the toner images on the intermediate transfer belt 24 are transferred to a transfer material together in timing similar to that of the normal copy. Then, the transfer material is conveyed to the fixer 40 by the paper conveying unit 39. When the transfer material is completely fixed, the transfer material is discharged onto the external copy tray 43.

It is possible to process (mirror face, shading, slanting style, repeat, interior extraction, color processing, etc.) and synthesize the images at an image forming time of the second original by using a creating function in addition to a zooming function.

When the image synthesis is stopped on the way, the toner images on the intermediate transfer belt 24 are cleaned by the belt cleaning unit 32 using the clear/stop key 83 on the operating section 80 until a time point at which the image synthesis is completed by the display editor 50. Accordingly, waste of a transfer paper sheet is prevented.

Figure 9:
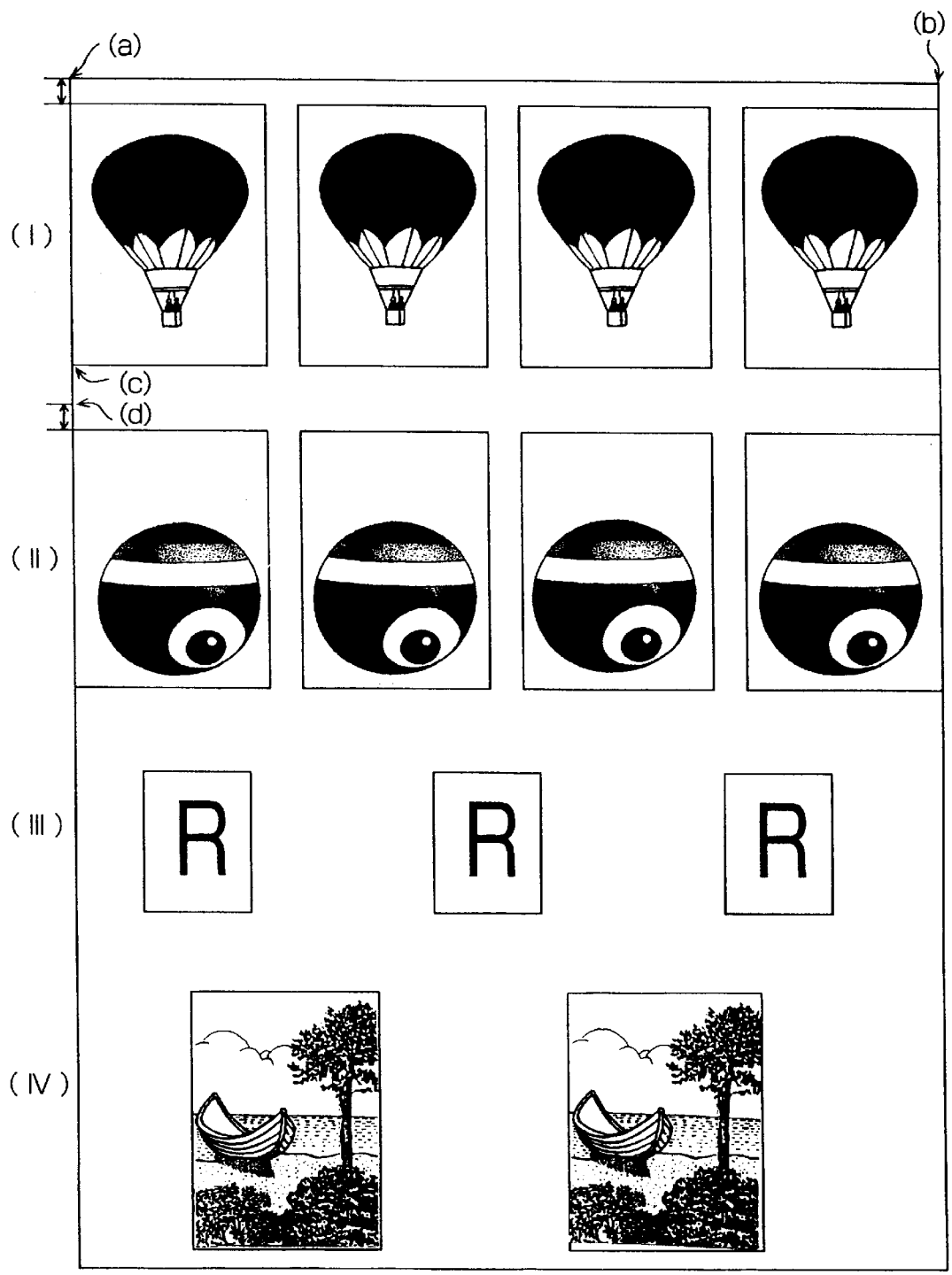
FIG. 9 is an explanatory view showing the movement of an intermediate transfer belt when images of small sizes are formed.

In the above description, the position of a synthetic image is moved by the writing control in both main and cross scanning operations. Therefore, a reciprocating operation is performed on a cross scanning side by adding a marginal length to a transversal size (210 mm) of the intermediate transfer belt 24 even when images of small sizes equal to or smaller than a transversal size of sheet A4 are synthesized. In particular, a longitudinal size (297 mm) of sheet A4 is restricted such that a picture is formed in one rotation of the photosensitive drum 17 to align the positions of paper sheets with each other. Therefore, images are formed by performing a reciprocating operation in which a marginal length is added to a size (420 mm) of sheet A3. At this time, if the reciprocating operation is performed in conformity with an image synthetic size and synthetic positions of the images on the cross scanning side are controlled by moving the intermediate transfer belt 24, no drive motor is uselessly moved so that no useless power consumption is caused. For example, FIG. 9 shows synthesis of images finally obtained on the intermediate transfer belt 24 at a making time of a full color synthetic copy at which all images of A4 full color originals of four kinds are transferred to a transfer paper sheet having a longitudinal size of sheet A4.

The image synthesis on the intermediate transfer belt 24 shown in FIG. 9 will next be explained.

A first original (size A4) is first arranged on the contact glass 4 and the option key 82 is pushed down. Further, the number of synthetic times is designated as 4 (means originals of four kinds) by operating the ten key 85 four times. Next, a first original begins to be read by the color scanner 1 by pushing down the reading key 53 of the display editor 50. Thus, an image of the first original is outputted to the display editor 50. At this time, no color printer 2 performs an image forming operation with respect to the image of the first original.

Next, an image is designated by operating the cursor key 59 and the point designating key 87 in the display editor 50. Further, the original of size A4 is zoomed to a size (I) in FIG. 9 by the zooming key 57. The image of the first original is moved in a main scanning direction (a direction from a to b in FIG. 9) by pushing down the scroll key 58. Thus, four images in total are synthesized on the indicator 51 of the display editor 50.

When the print starting key 84 is next pushed down, the color scanner 1 is operated to again read the first original on the contact glass 4. An operation of each of constructional portions for making a black toner image on the intermediate transfer belt 24 is started. This operation is different from a normal operation. Namely, with respect to a longitudinal size (297 mm) of sheet A4 in the normal operation, there is a restriction in which one picture must be synthesized in one rotation of the photosensitive drum 17 to align the positions of paper sheets with each other. Accordingly, the images are synthesized by performing a reciprocating operation in which a marginal length is added to a size (420 mm) of sheet A3.

However, when images of small sizes are synthesized, the intermediate transfer belt 24 goes (is moved forward) by a length provided by adding a marginal length to a distance from a to c in FIG. 9. At this time, the black toner image is transferred from the photosensitive drum 17 onto the intermediate transfer belt 24. When the black toner image is completely transferred onto the intermediate transfer belt 24, the intermediate transfer belt 24 is separated from the photosensitive belt 17 and is simultaneously returned. A returning amount of the intermediate transfer belt 24 at this time is equal to a forward moving amount. Accordingly, the intermediate transfer belt 24 is returned by the distance from c to a in FIG. 9. Then, similar to the black toner image, a cyan toner image and a magenta toner image are next formed on the intermediate transfer belt 24. When a yellow toner image of the final color is transferred onto the intermediate transfer belt 24, the intermediate transfer belt 24 goes (is moved by a distance from a to d) until an image end tip position d for forming the next image (II) in FIG. 9. Thereafter, the movement of the intermediate transfer belt 24 is stopped and the intermediate transfer belt 24 attains a standby state.

Next, a second original is set on the contact glass 4 and an image is designated by operating the cursor key 59 and the point designating key 87 in the display editor 50. Further, the original of size A4 is zoomed to the size (II) in FIG. 9 by the zooming key 57. An image of the first original is moved in a main scanning direction (a direction from a to b in FIG. 9) by pushing down the scroll key 58. Thus, four images in total are synthesized on the indicator 51 of the display editor 50. Thereafter, the full color synthesized images are transferred to a transfer material together.

Starting timing of the image formation can be arbitrarily changed in accordance with difficulty of the image synthesis. Cases of simple and complicated syntheses will next be explained in detail.

<Case of simple synthesis>

As shown in FIG. 6, when there is relatively no restriction of image synthesis and images can be easily synthesized, an image forming operation is immediately started when the print starting key 84 is pushed down. Thus, a first original image is formed on the intermediate transfer belt 24. Thereafter, similar to the first original, while an image of a second original is read by the color scanner 1 every color, the second original image is written to the photosensitive drum 17 by the optical unit 11. In this case, no second original image is outputted to the display editor 50. Thus, an electrostatic latent image formed on the photosensitive drum 17 is developed by using the black (BK) developing device 25, the cyan (C) developing device 26, the magenta (M) developing device 27 and the yellow (Y) developing device 28. Thereafter, images of the four overlapped colors each transferred onto the intermediate transfer belt 24 every color are formed as the second original image by the transfer bias roller 29. After these two images of the first and second originals are synthesized, these images are transferred to a transfer material together.

<Case of complicated synthesis>

In the case of complicated image synthesis using the display editor 50 as in the image syntheses of FIGS. 7 to 9, it is preferable to confirm synthesized images on the indicator 51 of the display editor 50 and then again read these images and synthesize these images so as to avoid failure in the image synthesis. In this case, starting timing of the image formation is changed in accordance with difficulty of the image synthesis. Concretely, the starting timing of the image formation is changed in pushing-down timings of the print starting key 84 and the reading key 53. Otherwise, the images are moved and processed at a synthesizing time of the second original. However, a complicated synthetic mode may be automatically started when the display editor 50 is used.

In the image synthesis in each of FIGS. 7 and 8, the first original image begins to be formed before this first original image is confirmed by the display editor 50. The second original image is outputted to the display editor 50, but no formation of this second original image is started. In the case of the image synthesis of FIG. 9, no first original image is formed.

In the case of the simple synthesis, an image is formed without confirming this image by the display editor 50 so that a final image is correspondingly outputted rapidly. In the case of the complicated synthesis, images are synthesized after these images are confirmed by the display editor 50. Accordingly, there is no failure in a synthetic operation so that toner and a transfer paper sheet are not uselessly used.

In the above embodiment, the image synthesis of full color originals is explained as an example. However, images of monochromatic color originals and black-and-white originals can be also synthesized in the present invention.

Since the color image forming apparatus in the present invention is constructed as above, the following effects can be obtained.

The color image forming apparatus has writing means for synthesizing a plurality of original images on a carrier, display editing means for displaying a process of image synthesis using the writing means on a display, and control means for writing a synthesized image in accordance with a synthetic condition and transferring toner images finally formed on the carrier to a transfer material together. Accordingly, it is possible to provide a color image forming apparatus which can accurately synthesize the images and can be obtained simply and can be cheaply manufactured.

In the color image forming apparatus, the display editing means has a function for displaying an image read by a scanner in the display. Accordingly, image contents before synthetic processing can be confirmed in advance.

In the color image forming apparatus, the display editing means has a function for displaying a synthetic image formed on the carrier in the display. Accordingly, an image having the same contents as an actually printed (copied) image can be displayed in the display and can be confirmed before print (copy). Accordingly, it is possible to prevent waste of a transfer paper sheet and toner.

In the color image forming apparatus, the display editing means has means for displaying the position of a synthetic image formed on the carrier in the display and also has changing means for changing displayed contents of the display means. Accordingly, it is easy to judge whether images can be synthesized or not. Further, the displayed contents can be changed rapidly and accurately.

In the color image forming apparatus, the display editing means has processing means capable of processing a synthetic image formed on the carrier in accordance with necessity and also has display means for displaying this processed image. Accordingly, the synthetic image can be processed while displayed contents of the synthetic image are confirmed, thereby reducing failure in the image synthesis.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color image forming apparatus in which an electrostatic latent image based on image data is formed on a photosensitive body and a toner image obtained by developing said electrostatic latent image with toner is transferred from said photosensitive body to a carrier, and toner images of one or plural colors are transferred to a transfer material together after each of said toner images of one or plural colors is completely transferred to the carrier the color image forming apparatus comprising:

writing means for synthesizing plural original images onto said carrier, said plural original images comprising a first original image corresponding to a first original and a second original image corresponding to a second original;

display editing means for displaying the original images to be synthesized as synthesized images in a display, said first original image and said second original image being displayed on said display simultaneously when said second original is read; and control means for writing the synthesized images in accordance with a synthetic condition and transferring together the toner images finally formed on said carrier to the transfer material.

2. A color image forming apparatus as claimed in claim 1, wherein said display editing means includes a mechanism for displaying in said display an image read by a scanner.

3. A color image forming apparatus as claimed in claim 1, wherein said display editing means includes a mechanism for displaying in said display at least one of the synthesized images formed on said carrier.

4. A color image forming apparatus as claimed in claim 1, wherein said display editing means includes means for displaying in the display a position of at least one of the synthesized images formed on said carrier and also includes changing means for changing displayed contents of the means for displaying.

5. A color forming apparatus as claimed in claim 1, wherein said display editing means comprises, processing means for processing at least one of the synthesized images formed on said carrier as a processed synthetic image, and display means for displaying the processed synthetic image.

6. A color image forming apparatus as claimed in claim 1, wherein said control means controls a series of operations in a synthetic image forming process such that the first original image is formed on said carrier simultaneously when the first original is read; and the second original image is formed on said carrier forming said first original image thereon simultaneously when the second original is read.

7. A color image forming apparatus in which an electrostatic latent image based on image data is formed on a photosensitive body and a toner image obtained by developing said electrostatic latent image with toner is transferred from said photosensitive body to a carrier, and toner images of one or plural colors are transferred to a transfer material together after each of said toner images of one or plural colors is completely transferred to the carrier, the color image forming apparatus comprising:

writing means for synthesizing plural original images onto said carrier;

display editing means for displaying the original images to be synthesized as synthesized images in a display; and control means for writing the synthesized images in accordance with a synthetic condition and transferring together the toner images finally formed on said carrier to the transfer material, said control means for controlling a series of operations in a synthetic image forming process such that, a first original image is formed on said carrier simultaneously when a first original is read, and second original image is formed on said carrier forming said first original image thereon after a synthetic image displayed on said display in accordance with a synthetic condition designated by said operator is confirmed.

8. A color image forming apparatus in which an electrostatic latent image based on image data is formed on a photosensitive body and a toner image obtained by developing said electrostatic latent image with toner is transferred from said photosensitive body to a carrier, and toner images of one or plural colors are transferred to a transfer material together after each of said toner images of one or plural colors is completely transferred to the carrier, the color image forming apparatus comprising:

writing means for synthesizing plural original images onto said carrier;

display editing means for displaying the original images to be synthesized as synthesized images in a display; and control means for writing the synthesized images in accordance with a synthetic condition and transferring together the toner images finally formed on said carrier to the transfer material, said control means for controlling a series of operations in a synthetic image forming process such that, a first original image is formed on said carrier after a first synthetic image displayed on said display in accordance with a synthetic condition designated by an operator with respect to a first original is confirmed, and a second original image is formed on said carrier forming said first original image thereon after a second synthetic image displayed on said display in accordance with a synthetic condition designated by the operator with respect to a second original is confirmed.

9. A color image forming method in which an electrostatic latent image based on image data is formed on a photosensitive body and a toner image obtained by developing this electrostatic latent image by using toner is transferred from said photosensitive body to a carrier, and toner images of one or plural colors are transferred to a transfer material together after each of these toner images of one or plural colors is completely transferred to the carrier;

the color image forming method comprising the steps of:

a step for reading a first original by color image reading means;

a step for forming a first original image read by said color image reading means on said carrier simultaneously when the first original image is displayed on a display;

a step for reading a second original by said color image reading means;

a step for synthesizing a second original image read by said color image reading means onto said carrier forming said first original image thereon simultaneously when the second original image is displayed on said display; and a step for transferring the synthetic images formed on said carrier to a transfer member together.

10. A color image forming method in which an electrostatic latent image based on image data is formed on a photosensitive body and a toner image obtained by developing this electrostatic latent image by using toner is transferred from said photosensitive body to a carrier, and toner images of one or plural colors are transferred to a transfer material together after each of these toner images of one or plural colors is completely transferred to the carrier;

the color image forming method comprising the steps of:

a step for reading a first original by color image reading means;

a step for forming a first original image read by said color image reading means on said carrier simultaneously when the first original image is displayed on a display;

a step for reading a second original by said color image reading means;

a step for displaying a second original image read by said color image reading means on said display;

a step for designating a synthetic condition of said second original image with respect to said first original image on said display;

a step for displaying a synthetic image composed of said first and second original images on said display in accordance with said synthetic condition;

a step for again reading said second original by said color image reading means;

a step for synthesizing the second original image onto said carrier forming said first original image thereon in accordance with said synthetic condition; and a step for transferring the synthetic images formed on said carrier to a transfer member together.

11. A color image forming method in which an electrostatic latent image based on image data is formed on a photosensitive body and a toner image obtained by developing this electrostatic latent image by using toner is transferred from said photosensitive body to a carrier, and toner images of one or plural colors are transferred to a transfer material together after each of these toner images of one or plural colors is completely transferred to the carrier;

the color image forming method comprising the steps of:

a step for reading a first original by color image reading means;

a step for displaying a first original image read by said color image reading means on said display;

a step for designating a synthetic condition of said first original image on said display;

a step for displaying a synthetic image of said first original image on said display in accordance with said synthetic condition of the first original image;

a step for again reading said first original by said color image reading means;

a step for synthesizing the first original image onto said carrier in accordance with said synthetic condition of the first original image;

a step for reading a second original by said color image reading means;

a step for displaying a second original image read by said color image reading means on said display;

a step for designating a synthetic condition of said second original image on said display;

a step for displaying a synthetic image composed of said first and second original images on said display in accordance with the synthetic condition of said second original image;

a step for again reading said second original by said color image reading means;

a step for synthesizing the second original image onto said carrier forming said first original image thereon in accordance with said synthetic condition of the second original image; and a step for transferring the synthetic images formed on said carrier to a transfer material together.

* * * * *